United States Patent
McAllister et al.

(10) Patent No.: US 9,319,362 B1
(45) Date of Patent: Apr. 19, 2016

(54) MESSAGING SYSTEM WITH DISTRIBUTED FILTERING MODULES WHICH REGISTER INTERESTS, REMOVE ANY MESSAGES THAT DO NOT MATCH THE REGISTERED INTEREST, AND FORWARD ANY MATCHED MESSAGES FOR DELIVERY

(75) Inventors: Shawn McAllister, Manotick (CA); Paul Kondrat, Ottawa (CA)

(73) Assignee: Solace Systems, Inc., Ottawa, ON (CA)

( * ) Notice: Subject to any disclaimer, the term of this patent is extended or adjusted under 35 U.S.C. 154(b) by 1094 days.

(21) Appl. No.: 13/357,951

(22) Filed: Jan. 25, 2012

(51) Int. Cl.
*G06F 15/16* (2006.01)
*H04B 3/20* (2006.01)
*H04L 12/58* (2006.01)
*H04L 12/54* (2013.01)
*H04L 12/70* (2013.01)
*H04L 12/947* (2013.01)

(52) U.S. Cl.
CPC .............. *H04L 51/14* (2013.01); *H04L 12/54* (2013.01); *H04L 12/5689* (2013.01); *H04L 12/5855* (2013.01); *H04L 49/252* (2013.01); *H04L 2012/564* (2013.01); *H04L 2012/5642* (2013.01)

(58) Field of Classification Search
CPC . H04L 12/1834; H04L 12/54; H04L 12/5689; H04L 2012/564; H04L 2012/5642; H04L 12/5855; H04L 49/252; H04L 51/14
USPC .................. 709/217, 206, 245, 246; 370/389
See application file for complete search history.

(56) References Cited

U.S. PATENT DOCUMENTS

| | | | | |
|---|---|---|---|---|
| 5,555,346 A | * | 9/1996 | Gross et al. ...................... | 706/45 |
| 5,870,605 A | * | 2/1999 | Bracho et al. ................. | 719/318 |
| 5,873,084 A | * | 2/1999 | Bracho et al. | |
| 5,974,417 A | * | 10/1999 | Bracho et al. | |
| 6,021,443 A | * | 2/2000 | Bracho et al. ................. | 709/241 |
| 6,073,142 A | * | 6/2000 | Geiger et al. ................. | 715/205 |
| 6,091,724 A | * | 7/2000 | Chandra et al. ............... | 370/390 |
| 6,181,697 B1 | * | 1/2001 | Nurenberg .......... | H04L 12/1836 370/390 |
| 6,216,132 B1 | * | 4/2001 | Chandra et al. | |
| 6,336,119 B1 | * | 1/2002 | Banavar et al. | |
| 6,442,589 B1 | * | 8/2002 | Takahashi et al. ............ | 709/203 |
| 6,732,175 B1 | * | 5/2004 | Abjanic ....................... | 709/227 |
| 7,131,141 B1 | * | 10/2006 | Blewett ............... | H04L 63/0209 709/223 |
| 7,428,580 B2 | * | 9/2008 | Hullfish et al. ............... | 709/207 |
| 7,716,525 B1 | | 5/2010 | Buchko et al. | |
| 7,720,910 B2 | * | 5/2010 | Goodman et al. ............ | 709/206 |
| 7,720,914 B2 | * | 5/2010 | Goodman et al. ............ | 709/206 |
| 7,831,670 B2 | * | 11/2010 | Goodman et al. ............ | 709/206 |
| 7,890,572 B2 | * | 2/2011 | Goodman et al. ............ | 709/203 |
| 7,941,488 B2 | * | 5/2011 | Goodman et al. ............ | 709/206 |
| 8,122,118 B2 | * | 2/2012 | Hickson et al. ............... | 709/224 |

(Continued)

*Primary Examiner* — Daniel C Murray
(74) *Attorney, Agent, or Firm* — Marks & Clerk; Richard J. Mitchell (57) ABSTRACT

In a message delivery system, messages are carried over a network in packets. Server hosts support applications for originating and receiving messages and network interfaces. Switches interconnect the server hosts and form the packet network. Some of the switches are linked to the local server hosts. Distributed filtering/matching modules associated with the local server hosts register interests for applications on the associated local server hosts, inspect packets received over the network or from a local server host to match messages with registered interests and remove any unmatched packets from the packets. The matched messages are forwarded to the local server host for delivery to the applications. This system offers the ability to use special purpose hardware for the filtering/matching function without requiring connections to a common message broker.

26 Claims, 5 Drawing Sheets

(56) References Cited

U.S. PATENT DOCUMENTS

| | | | |
|---|---|---|---|
| 8,244,817 B2* | 8/2012 | Kay | 709/206 |
| 8,255,684 B2* | 8/2012 | Benshetler | H04L 63/0823 713/153 |
| 8,306,831 B2* | 11/2012 | Eisenberger et al. | 705/3 |
| 8,307,029 B2* | 11/2012 | Davis et al. | 709/203 |
| 8,386,577 B2* | 2/2013 | Hickson et al. | 709/206 |
| 8,451,762 B2* | 5/2013 | Liu | H04L 12/1863 370/312 |
| 8,488,603 B2* | 7/2013 | Zha | H04L 12/18 370/390 |
| 8,676,887 B2* | 3/2014 | Kim et al. | 709/204 |
| 8,694,774 B2* | 4/2014 | Benshetler | H04L 63/0823 380/286 |
| 8,761,069 B2* | 6/2014 | Banerjea | H04L 12/1877 370/312 |
| 8,799,371 B2* | 8/2014 | Davis et al. | 709/206 |
| 8,867,539 B2* | 10/2014 | Glasser | H04L 12/1836 370/390 |
| 8,898,336 B2* | 11/2014 | Hamada | H04L 61/2517 709/202 |
| 8,903,925 B2* | 12/2014 | Li et al. | 709/206 |
| 8,965,964 B1* | 2/2015 | Odell et al. | 709/206 |
| 9,148,421 B2* | 9/2015 | Benshetler et al. | H04L 63/0823 |
| 2002/0116349 A1* | 8/2002 | Batachia et al. | 706/11 |
| 2002/0120748 A1* | 8/2002 | Schiavone et al. | 709/227 |
| 2003/0115317 A1* | 6/2003 | Hickson et al. | 709/224 |
| 2003/0156687 A1* | 8/2003 | Messager | 379/67.1 |
| 2004/0019645 A1* | 1/2004 | Goodman et al. | 709/206 |
| 2004/0122906 A1* | 6/2004 | Goodman et al. | 709/206 |
| 2005/0063393 A1* | 3/2005 | Lin | H04L 29/12462 370/395.54 |
| 2005/0114533 A1* | 5/2005 | Hullfish et al. | 709/230 |
| 2005/0132008 A1* | 6/2005 | Brown et al. | 709/206 |
| 2005/0265340 A1* | 12/2005 | Wu | H04L 29/12009 370/389 |
| 2005/0267896 A1* | 12/2005 | Goodman et al. | 707/10 |
| 2005/0273499 A1* | 12/2005 | Goodman et al. | 709/206 |
| 2006/0018335 A1* | 1/2006 | Koch | H04L 12/18 370/432 |
| 2006/0036679 A1* | 2/2006 | Goodman et al. | 709/203 |
| 2006/0155578 A1* | 7/2006 | Eisenberger et al. | 705/2 |
| 2006/0168043 A1* | 7/2006 | Eisenberger et al. | 709/206 |
| 2006/0187942 A1* | 8/2006 | Mizutani | H04L 12/5695 370/401 |
| 2006/0272013 A1* | 11/2006 | Kilgore | 726/11 |
| 2007/0118874 A1* | 5/2007 | Adams et al. | 726/1 |
| 2007/0239830 A1* | 10/2007 | Barnes et al. | 709/206 |
| 2008/0117855 A1* | 5/2008 | Choi | H04W 8/30 370/315 |
| 2009/0016499 A1* | 1/2009 | Hullfish et al. | 379/93.01 |
| 2009/0024845 A1* | 1/2009 | Benshetler | H04L 63/0823 713/156 |
| 2009/0144377 A1* | 6/2009 | Kim et al. | 709/206 |
| 2009/0147718 A1* | 6/2009 | Liu | H04L 12/1863 370/312 |
| 2009/0150489 A1* | 6/2009 | Davis et al. | 709/204 |
| 2009/0150501 A1* | 6/2009 | Davis et al. | 709/206 |
| 2009/0216900 A1* | 8/2009 | Abjanic et al. | 709/235 |
| 2009/0262677 A1* | 10/2009 | Banerjea | H04L 12/1877 370/312 |
| 2010/0049693 A1* | 2/2010 | Cao et al. | 707/2 |
| 2010/0120009 A1* | 5/2010 | Ayers | 434/336 |
| 2010/0142530 A1* | 6/2010 | Zha | H04L 12/18 370/390 |
| 2010/0151819 A1* | 6/2010 | D'Englere | 455/406 |
| 2010/0153511 A1* | 6/2010 | Lin | 709/207 |
| 2010/0217811 A1* | 8/2010 | Kay | 709/206 |
| 2010/0256994 A1* | 10/2010 | Eisenberger et al. | 705/3 |
| 2010/0262917 A1* | 10/2010 | Hardy et al. | 715/735 |
| 2011/0069705 A1* | 3/2011 | Glasser | H04L 12/1836 370/390 |
| 2011/0235642 A1* | 9/2011 | Dyckerhoff et al. | 370/392 |
| 2012/0011281 A1* | 1/2012 | Hamada | H04L 61/2517 709/246 |
| 2012/0117172 A1* | 5/2012 | Hickson et al. | 709/206 |
| 2012/0331289 A1* | 12/2012 | Benshetler | H04L 63/0823 713/156 |
| 2013/0072239 A1* | 3/2013 | Hullfish et al. | 455/466 |
| 2013/0073656 A1* | 3/2013 | Hullfish et al. | 709/206 |
| 2013/0073657 A1* | 3/2013 | Hullfish et al. | 709/206 |
| 2013/0110948 A1* | 5/2013 | Davis et al. | 709/206 |
| 2013/0198308 A1* | 8/2013 | Yang et al. | 709/206 |
| 2013/0304826 A1* | 11/2013 | Li et al. | 709/206 |
| 2014/0195801 A1* | 7/2014 | Benshetler | H04L 63/0823 713/156 |
| 2014/0301382 A1* | 10/2014 | Banerjea | H04L 12/1877 370/338 |
| 2014/0344386 A1* | 11/2014 | Davis et al. | 709/206 |
| 2014/0351355 A1* | 11/2014 | Hullfish et al. | 709/206 |
| 2015/0032831 A1* | 1/2015 | Hullfish et al. | 709/206 |
| 2015/0039777 A1* | 2/2015 | Glasser | H04L 12/1836 709/230 |
| 2015/0106423 A1* | 4/2015 | Abjanic et al. | 709/202 |
| 2015/0236958 A1* | 8/2015 | Abjanic | H04L 47/125 709/201 |
| 2015/0237023 A1* | 8/2015 | Abjanic | H04L 63/0471 713/153 |

* cited by examiner

MESSAGING SYSTEM WITH DISTRIBUTED FILTERING MODULES WHICH REGISTER INTERESTS, REMOVE ANY MESSAGES THAT DO NOT MATCH THE REGISTERED INTEREST, AND FORWARD ANY MATCHED MESSAGES FOR DELIVERY

FIELD OF THE INVENTION

This invention relates to data communication networks and in particular to a method of message delivery with distributed hardware message filtering.

BACKGROUND OF THE INVENTION

In the prior art, many message delivery systems exist which offer message delivery between endpoints, such as between different applications. The message delivery systems may implement different message delivery semantics such as point to point or publish/subscribe and different service types such as assured (also know as guaranteed or persistent) and reliable (also known as best effort).

Such messaging systems provide for loosely coupled message delivery between the message source and the receiving application (for one-to-one delivery) or receiving applications (for one-to-many delivery). A messaging system is comprised of many components, some of which are standard and some of which are specific to the particular messaging system. These components include server hosts, applications, network interface cards, network switches, message brokers, software libraries etc.; a particular instance of a messaging system may include some or all of these components. There may also be other sub-functions not mentioned in the previous list that may be featured in a particular implementation. The way in which these components are assembled to create a messaging system is one way messaging system implementations are differentiated. A particular implementation of a messaging system may have advantages over other implementations depending on the requirements of the applications using the messaging system and the characteristics of the message flows between these applications.

The mechanism by which the messaging system determines how to route a particular message to its destination endpoint(s) is another form of differentiation between messaging systems know in the art. Prior art messaging systems use topics (metadata tags added by the message source) or inspection of the message content itself to determine which endpoint(s) to deliver a particular message to. The endpoints may be different applications or a queue that could be shared by multiple applications or a combination of applications and queues. The criteria used by the message delivery system to determine which messages to deliver to which endpoint(s) may be configured by the administrator of the system or the endpoint(s) themselves can indicate their own interests in the form of subscription requests.

Broadly speaking there are two messaging system architectures (and many variants of each). The two architectures are broker and brokerless as they are known in the art. In the broker based systems there is an intermediate system (the broker) in between sending and receiving systems. One advantage of the broker based system is that the broker may be implemented in a separate machine from the applications and therefore contain hardware designed specifically to offload systems hosting the applications from specific processing tasks associated with a messaging system. A disadvantage of the broker based system is that all message flow must pass through the broker and this can add latency to the system especially when message flows are one to many. Under these usage patterns the finite egress bandwidth of the broker and associated serialization latency are at issue.

Brokerless systems have the advantage that there is no intermediate system through which all message flows must pass. Often brokerless systems rely on networking technologies that employ multicast. The networking devices that implement the underlying network can replicate data with high efficiency and have fewer restrictions in terms of egress bandwidth. The use of multicast in the underlying network has the effect of reducing latency associated with the broker and its finite egress bandwidth but at the cost of pushing other functionality implemented in the broker off to the systems hosting the applications. For example the machines hosting applications that are receiving message data are typically required to inspect all messages received over a particular multicast channel and discard messages that the application is not interested in processing; in a broker based system the broker would perform this function.

For many applications a messaging system that features the advantages of both broker and brokerless topologies is desirable. Specifically a messaging system that features the latency characteristics of brokerless systems (particularly with message flows that are one to many) while offloading messaging system processing from the systems hosting the applications as is typical of broker based systems.

SUMMARY OF THE INVENTION

According to the present invention there is provided a message delivery system for delivering messages over a network, wherein the messages are carried over the network in packets, comprising a plurality of server hosts supporting applications for originating and receiving messages; a plurality of switches interconnecting said server hosts and forming the packet network, wherein at least some of said switches on the edge of the network serving as ingress/egress switches are linked to network interfaces of the server hosts; and distributed filtering/matching modules associated with the server hosts; and wherein the filtering/matching modules are configured to: a) register interests associated with applications on the server hosts; b) inspect packets received over the network for a local server host or received from the local server host to match messages carried by the packets with the registered interests; c) remove any unmatched messages from the packets; and d) forward packets carrying any matched messages to the local server host for delivery to the applications.

In such a packet network the messages intended for the destination hosts are carried in packets. Typically, each packet will carry a number of messages, although in some cases a large message can be carried by one or more packets. The packets are typically IP packets, which have a header and payload. The messages are carried in the packet payload.

The packets are delivered through the network based on a multicast IP address. Embodiments of the invention examine the packets at the egress switches to filter the messages intended for applications on destination server hosts. In one embodiment, the filter modules at the egress switches inspect the packet payloads and filter the messages from packets arriving over the network, or from local hosts, and forward the messages of interest to groups of applications on the destination servers using a multicast address. In this case, not all the messages carried by the packets are necessarily of interest to each of the destination applications in the multicast group. In this embodiment it is left to the individual applications to discard the messages that are not of interest to that particular application. This embodiment saves bandwidth on the link from the egress switch to the host, but requires more processing by the host applications since some residual filtering is left to the host applications.

In an alternative embodiment, the filter modules at the egress switches filter the messages from packets arriving over the network and forward the messages of interest to specific applications on the destination servers over a point-to-point connection using a unicast address. In this case, only the messages of interest to each application are sent to that application. This embodiment requires more bandwidth on the link from the egress switch to the host, but relieves the host applications of any filtering responsibility.

Embodiments of the invention thus provide a novel system that offers some of the benefits of both a brokerless system and a brokered system. The distributed filtering/matching modules on the edge of the network can be implemented in special purpose hardware optimized for the filtering matching function. In one embodiment they may be associated with enhance ports in the switches at the edge of the network.

According to another aspect the invention provides a method of delivering messages over a network having a plurality of switches including ingress/egress switches attached to local server hosts, and wherein the messages are carried over the network in packets, comprising receiving messages originating in supporting applications on the local server hosts; forwarding packets carrying the messages to ingress/egress switches attached to the destination server hosts; inspecting the packets in distributed filtering/matching modules to match messages received over the network or from a local server host with the registered interests; removing any unmatched messages from the packets; forwarding packets carrying the matched messages to the local server host for delivery to the applications.

In yet another aspect the invention provides a filtering/matching module for association with local server hosts supporting applications for originating messages in a message delivery system for delivering messages over a network, wherein the messages are carried over the network in packets, which is configured to register interests for applications on the associated local server hosts; inspect the packets received over the network or from a local server host to match messages carried by the packets with registered interests so as to identify destination applications on the local server host; remove any unmatched messages from the packets; and deliver packets carrying any matched messages to the local server host for delivery to the applications.

BRIEF DESCRIPTION OF THE DRAWINGS

The invention will now be described in more detail by way of example with reference to the accompanying drawings in which.

DETAILED DESCRIPTION OF THE PREFERRED EMBODIMENTS

Figure 1:
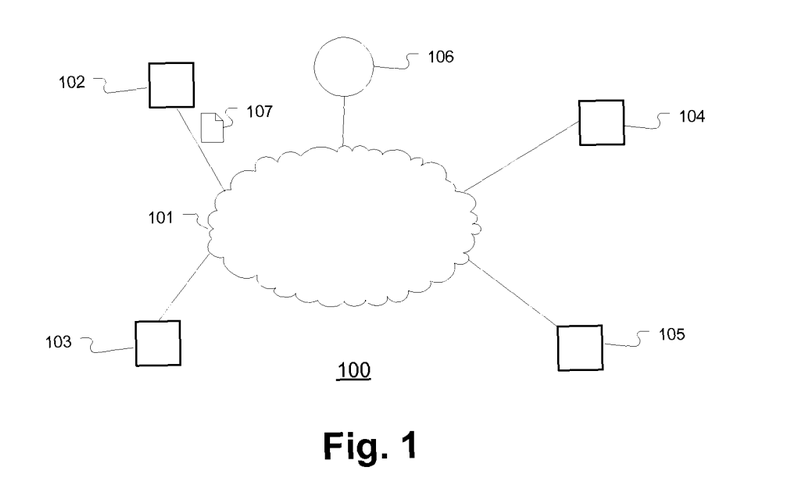
FIG. 1 shows an example of a broker based message delivery system.

FIG. 1 shows an example message delivery system 100 that is based on a brokered architecture. The message delivery system 100 consists of a series of server hosts 102-105 (often simply referred to as hosts). The server hosts 102-105 are general purpose computing devices know in the art as servers but could be any type of network attached computing device such as a desktop computer or mobile computing device such as a smart phone or tablet. The server hosts 102-105 host applications that make use of the messaging system and contain software that is itself part of the message delivery system. The server hosts 102-105 are connected to an underlying data communication network 101 which is based on industry standard technology such as IP, Ethernet, Infiniband or other. There is also a message broker 106 connected to the data communication network 101. The message broker 106 could be a single hardware or software entity or a network of devices as described in U.S. Pat. No. 7,716,525.

Figure 3:
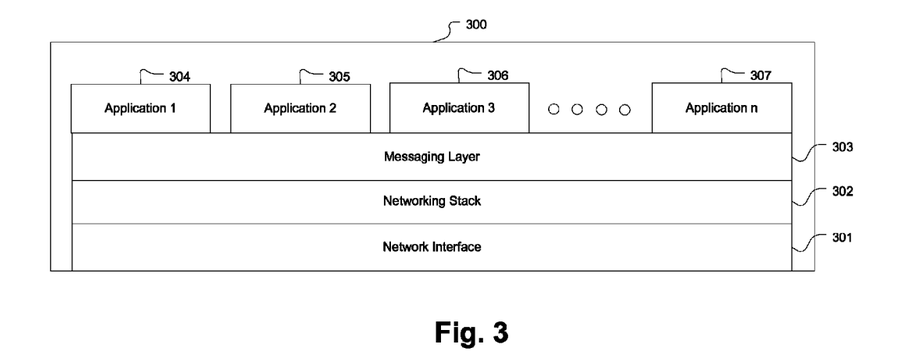
FIG. 3 shows the functional layers that exist within a server host that is a participant in a message delivery system.

FIG. 3 depicts a generic client of a message delivery system; in the example of FIG. 1 the client system 300 corresponds to one of the server hosts 102-105. It depicts the functional layers that exist within a client 300. The messages are carried by IP packets over the network.

Depending on the implementation of the message delivery system a particular functional layer may do more or less processing. The primary purpose of the client 300 is to host applications 304-307 that wish to make use of the services provided by the message delivery system. A single client 300 may host one or many such applications. The application(s) 304-307 access the services of the message delivery system via the messaging layer 303 which is software code that provides an application programming interface or API (also known as a library). An application 304-307 may make use of the message delivery system to send messages, receive messages or send and receive messages. In FIG. 3 the messaging layer 303 is shown as a single entity but depending on the implementation each application 304-307 may have a unique instance of the API embedded within it or in an alternate implementation the messaging layer 303 may contain its own process or daemon as it is known in the art that all applications 304-307 communicate with and share. The networking stack 302 is generally part of the operating system; its function is to perform any additional framing or formatting required for transmission over a network. Some networking technologies optionally use techniques such as remote direct memory access (RDMA) or kernel bypass to reduce latency; in these cases the networking stack 302 is implemented such that the messaging layer 303 can interact with the network interface 301 without involving the operating system. The network interface 301 is a hardware device that has a connection to a network; the connection also known as a link may be optical cable, copper cable or wireless. The combination of the network interface 301 and network stack 302 provides an abstract interface that the messaging layer 303 can use for communicating with other network-attached systems.

The following example describes the path a message 107 takes through the broker based message delivery system 100. The message 107 is generated by an application residing on one of the server hosts 102-105. In the example of FIG. 1 the message is generated by an application 304-307 residing in server host 102. The application 304-307 sends the message 107 to the messaging system by making a call to the API of the messaging layer 303. In the example of FIG. 1, in the sending direction, the messaging layer 303 on server host 102 is responsible for receiving a message 107 generated by one of the applications 304-307 and formatting or framing it in such a way that it can be extracted by the messaging layer 303 of another receiving application 304-307. Formatting and/or framing may include adding a topic string or number to the message if the message delivery system 100 uses topics to determine which systems are to receive a particular message 107 or if the message delivery system 100 is implementing point to point messaging then the messaging layer 303 must add the address of the destination system. Similarly if the content of the message 107 is used by the message delivery system 100 to determine the destination systems then the messaging layer 303 must only ensure that the message is framed in such a way that destination systems can extract the content of the message 107. It is important to note that there may be other optional control information added to the message 107 by the messaging layer 303 that is used by the message delivery system 100 to enable more advanced features; an example would be the addition of a sequence number to ensure that messages are delivered to a receiving application 304-307 in the same order in which they were sent and without loss.

Once the messaging layer 303 has finished framing and formatting the message it is sent on to the networking stack 302 and network interface 301 for transmission over the network 101 to the message broker 106. The network 101 consists of one or more devices commonly known in the art as switches. The switches implement standard networking protocols such as Ethernet, IP, Infiniband or the like.

The message broker 106 may be a software application running on a general purpose computing device similar to the server hosts 102-105 or a hardware device tailored to the tasks that a messaging system is required to perform. These tasks include networking, parsing data received from the network 101, filtering messages, matching messages received from sending applications to interests from receiving applications, storing messages, transforming messages and other tasks related to the implementation of a message delivery system. An example message broker is also described in U.S. Pat. No. 7,716,525. Upon receiving the message 107 message broker 106 must parse it and extract the control information as well as any data needed to determine the destination(s); the destination(s) for the message 107 may include applications 304-307 or queues. In order to determine the destination(s) for the message 107 the message broker 106 will take data associated with the message 107 and compare it to interests or subscriptions that the message broker 106 has collected from all the destinations participating in the broker based message delivery system 100. The interests collected from the destinations may be in the form of topic strings or hierarchical topic strings either of which may or may not contain wild cards or other forms of what is known in the art as regular expressions. Alternately the topics could be in the form of numbers or in some implementations of a message delivery system the interests describe characteristics of the message content. The collection of interests that the message broker 106 has received from all of its destinations are stored internal to the message broker 106 in a data structure know in the art as a forwarding table. The data extracted from the message 107 by the message broker 106 is compared to all of the interests collected in the forwarding table. For each entry in the forwarding table that produces a match to the extracted data a copy of the message 107 will be sent by the message broker 106 to the destination corresponding to that particular entry. These destinations may be applications 304-307 residing on server hosts 102-105 connected via the network 101 or queues that exist within the message broker 106. A server host 102-105 may be host to more than one destination application 304-307 for which a matching interest is detected.

In a broker based messaging system 100 the network 101 is typically implemented using a connection based networking technology such as TCP. The use of a connection-based protocol allows the message broker 106 to have a unique connection to the messaging layer 303 for each application 304-307 even though they connect to the network 101 via a common network interface 301. The message broker 106 may use these connection(s) to send a unique copy of the message 107 for each application 304-307 for which a match was detected in the previous step. Note that applications 304-307 that do not have a subscription matching message 107 do not receive message 107 and thus pay no bandwidth or processing cost associated with filtering message 107—this is performed by the broker on behalf of the subscribing applications. Also of note is that there may be application(s) 304-307 running on server host 102 aside from the one that generated message 107 that have registered a matching interest; the broker based message delivery system 100 allows for two possible implementations in this scenario. The first implementation is one in which the broker sends a copy of the message 107 back to the server host 102 that generated it on the connection dedicated to the application that registered the matching interest. This implementation is favored because the computationally intensive task of matching messages to interests is performed centrally by the broker 106. The second implementation is one in which the messaging layer 303 maintains a local forwarding table and compares the message 107 to the interests of local applications 304-307 and sends a copy to any that match. The second implementation maybe useful in situations where the bulk of the message flow is between applications 304-307 residing on the same client 300; this application is also known in the art as inter-process communication or IPC.

Previously the basic function of a broker based messaging system 100 was described. There are many additional optional features that an implementation of a broker based messaging system 100 may include such as storage of the message, message caching, broker redundancy etc. none of which affect the present invention. The distinguishing feature of the broker based messaging system 100 is that the matching of messages 107 to destinations is performed centrally; this function is computationally intensive especially when the complexity of the interests and the number of interests increases. One of the primary advantages of the broker based messaging system is that the matching function can be performed by specialized hardware contained in the message broker 106. The application of specialized hardware to this task allows it to be performed efficiently and without consuming resources on the server hosts 102-105. Stated another way, the messaging layer 303 and applications 304-307 residing on the server hosts 102-105 are offloaded of the task of inspecting every message 107 and filtering from the stream any messages which it is not interested in receiving. In the broker based messaging system 100 the server hosts 102-105 receive only messages that the resident applications 304-307 have registered an interest with the message broker 106 in receiving. This reduces CPU load on the server hosts 102-105 and facilitates the implementation of a computationally intensive task in specialized hardware where it can be performed with maximum efficiency. The primary disadvantage of the broker based messaging system 100 is that a message 107 must traverse the network 101 twice in order get to a destination; once from sending server host 102-105 to the message broker 106 and once from the message broker 106 to the destination server host 102-105. The additional latency added by the message broker 106 and the additional network transfer is undesirable in some applications.

Figure 2:
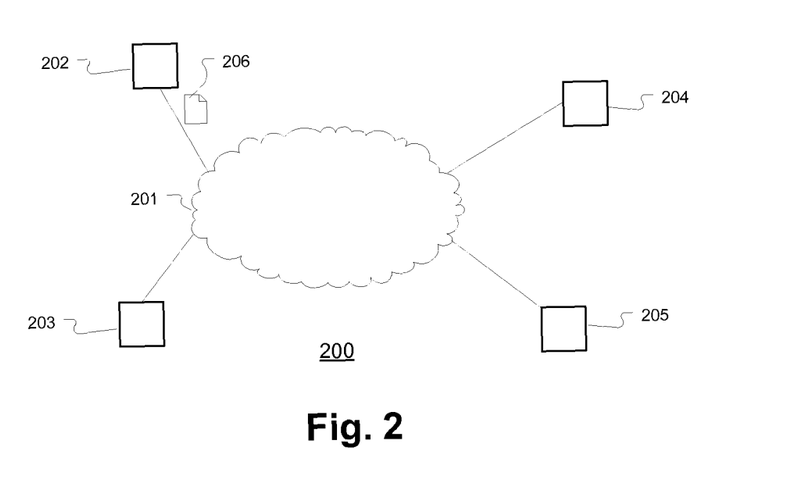
FIG. 2 shows an example of a brokerless message delivery system.

FIG. 2 is an example of a brokerless message delivery system. The brokerless message delivery system 200 shares many of the same components as the broker based message delivery system of FIG. 1; one obvious difference is the absence of the broker 106. The brokerless message delivery system 200 consists of a series of server hosts 202-205; these are similar to the server hosts 102-105 of FIG. 1. The server hosts 202-205 are connected to a network 201 that is similar to the network 101 of FIG. 1. A brokerless message delivery system 200 is often implemented using networking technologies that make use of multicast and this may put some additional requirements on the network 201. Multicast networking is supported by a number of widely available networking technologies such as Ethernet, IP, Infiniband and others.

The following example will describe the path a message 206 takes through the brokerless message delivery system 200 with emphasis on the differences between the broker based system 100 of the previous example. The message 206 is generated by an application residing on server host 202. Similar to the broker based message delivery system 100 of FIG. 1 there is a series of process steps that take place in the server host 202 as shown in FIG. 3. The application 304-307 of which a single server host 202-205 may contain one or many sends the message 206 to the messaging system by making an API call to messaging layer 303. The messaging layer 303 on server host 202 is responsible for receiving a message 206 generated by an application 304-307 and formatting or framing it such a way that it can be transmitted over the network 201 and extracted by a receiving system. This processing is similar to the processing performed in the broker based message delivery system 100 of FIG. 1 but may be different due to differences in the underlying network transport mechanisms employed by the two systems.

Once the messaging layer 303 has finished framing and formatting the message it is sent on to the networking stack 302. It is at this step that the differences between the broker based message delivery system 100 and the brokerless message delivery system 200 begin to become apparent. As previously described broker based message delivery systems 100 typically make use of point to point or connection based networking technologies such as TCP. Brokerless message delivery systems 200 typically make use of multicast network technologies, which are typically connectionless. Widely available networking technologies such as Ethernet, Infiniband and IP support both methods of communication. Networking technologies that optionally use techniques such as remote direct memory access (RDMA) or kernel bypass to reduce latency are equally applicable to brokerless message delivery systems 200 as they are to broker based message delivery systems 100. The networking stack 302 receives the message 206 formatted by the messaging layer 303, adds any additional framing or formatting required by the network 201 and passes the message 206 to the network interface 301 for transmission. Note that if there are other applications 304-307 on the sending system then the network stack 302 will replicate the message 206 and send back to the messaging layer 303 as if it had been received over the network 201; this is a feature of multicast networking that is supported by the network stack 302 of most operating systems.

The network 201 of the brokerless message delivery system 200 is very similar to the network 101 of the broker based message delivery system 100. Many brokerless message delivery systems 200 including systems relevant to the present invention make use of multicast networking protocols; as it relates to the present discussion the network 201 is assumed to be multicast capable. Historically some data networking systems relied on a shared wire or bus between systems participating in the network. The Ethernet 10Base2 standard is an example of such a system. In a 10Base2 network all of the connected systems are joined by a single co-axial cable. A consequence of such a network topology is that all systems connected to the cable can receive any data generated by any other connected system, naturally providing a multicast delivery. Modern networks such as 101 or 201 are implemented using point-to-point links rather than a shared wire or bus. In this type of network 201 server hosts 202-205 are connected by point-to-point cables either electrical or optical to networking devices known as switches. The switches have multiple interfaces and may connect to many hosts or other switches to create larger networks. The switches are capable of receiving data on one interface, replicating it and retransmitting it out of multiple interfaces. By employing these techniques the switches can mimic the multicast behaviors of the bus topology. Modern network switches are capable of providing multicast network service with remarkable efficiency as a result of years of design innovation and refinement. Of note is that with modern broadcast network technologies like Ethernet, the reality is that every host gets a unique copy of the data.

In the brokerless message delivery system 200 an application 304-307 residing on server host 202 wishes to send message 206 to a subset of applications 304-307 residing on the other server hosts 203-205 or another application residing on the same server host 202. The messaging layer 303 on server host 202 after formatting message 206 sends it to the network stack 302. After adding additional framing the network stack 302 will send the message 206 to any local applications 304-307 that are listening to the multicast group on which the message is to be sent (with the exception of the sending application) and via the network interface 301 and the network 201 to all the other server hosts 203-204 that have application(s) that are listening to the multicast group. The switches that make up the network 201 will replicate the packet(s) that contain message 206 and send a copy to the other server hosts 203-205. The packet(s) will be received by the network interface 301 of the server hosts 203-205 and will be passed up to the messaging layer 303 via the network stack 302. Upon the reception of a message 206 it is the function of the messaging layer 303 to determine which if any of the applications 304-307 have an interest in receiving such a message. This is a fundamental difference between the broker based message delivery system 100 and the brokerless message delivery system 200. In the broker based message delivery system 100 this filtering function is performed by the message broker 106, in the brokerless message delivery system 200 this function is performed by the messaging layer 303 on all participating server hosts 203-205 in the message delivery system. In the art there are two prevalent implementations of the messaging layer 303. In the first implementation a separate process known as a daemon does the messaging layer 303 processing for all applications 304-307 hosted on the system. In the second implementation a separate instance of the messaging layer 303 is embedded in each application 304-307 and the network stack 302 delivers a copy of the message 206 to each instance of the API that is listening to the multicast group. Note that in the daemon implementation on the sending server host 202 it is the daemon process that filters, replicates and distributes the message 206 to other local applications (if they have registered an interest in receiving such a message) and not the network stack 302 as previously described.

The messaging layer 303 of a particular server host 202-205 having received the message 206 from the network stack 302 must parse the message 206 and extract any data needed to determine the destination(s). In the daemon implementation the daemon process will do this processing for all applications 304-307 hosted on a given server host 202-205; in the daemonless implementation the messaging layer 303 instance in each application 304-307 performs this processing. The data extracted from the message 206 may be a topic (a metadata tag, text string or number as previously described) added by the messaging layer 303 in the sending server host 202 or some portion of the message content. In order to determine which if any of the applications 304-307 are interested in receiving the message 206 the messaging layer 303 must take the extracted data and compare it to interests that it has collected from the application(s) 304-307 that it is hosting. The interests collected from the application(s) 304-307 may be in the form of topic strings or hierarchical topic strings either of which may or may not contain wild cards or other forms of regular expressions to be matched to the topic sent with the message 206. Alternately the topics could be in the form of numbers and the interests could be in the form of a range or an exact match or in some implementations of a message delivery system 200 the interests may describe a substring or pattern contained within the message 206 content. For any of the interests that are deemed to be a match by the chosen algorithm to the current message 206, a copy of that message 206 is sent to the application 304-307 that registered the matching interest. It is important to note that this processing must be carried out in all of the server hosts 202-205 and possibly every application depending on whether or not daemon or daemonless implementation is used. Depending on the size of the topic space and the complexity of the rules used to match interests to messages, this processing can be onerous. If a host 202-205 cannot keep up processing the messages as they arrive, then message loss can occur which decreases the efficiency of the system and its applications. In the broker based message delivery system 100 the message broker 106 performs this processing in a central location offloading this processing from the destination server hosts 202-205 and applications 304-307.

A possible enhancement to the brokerless message delivery system 200 is to distribute the topic space across multiple multicast groups. Some multicast networking technologies such as IP multicast allow multiple multicast groups to be established such that not all of the server hosts 202-205 need to receive all of the multicast data. By assigning a subset of the topics to a particular multicast group the burden of filtering off unwanted messages at the destination server hosts 203-205 (in the previous example) can be reduced. The destination server hosts 203-205 will not receive data sent to multicast groups that carry no topics of interest. In some cases these (and similar) techniques can be used to reduce the cost of filtering off unwanted messages 206 at the destination server hosts 203-205. That said another management problem is created in terms of how to distribute topics to multicast groups in such a manner that applications can take advantage of the network filtering by not needing to join all multicast groups. Typically the number of topics in use is far more (e.g. 10× or more) the number of multicast groups supported by modern switches, so having one topic per multicast group is not technically feasible.

The present invention is a method of combining the advantages of both of the previously described message delivery systems 100 and 200. A method is presented that provides the reduced latency of the brokerless message delivery system 200 while offloading the server hosts 202-205 of the onerous task of matching message topics (or messages) to the interests of hosted applications 304-307 as in the broker based message delivery system 100.

Figure 4:
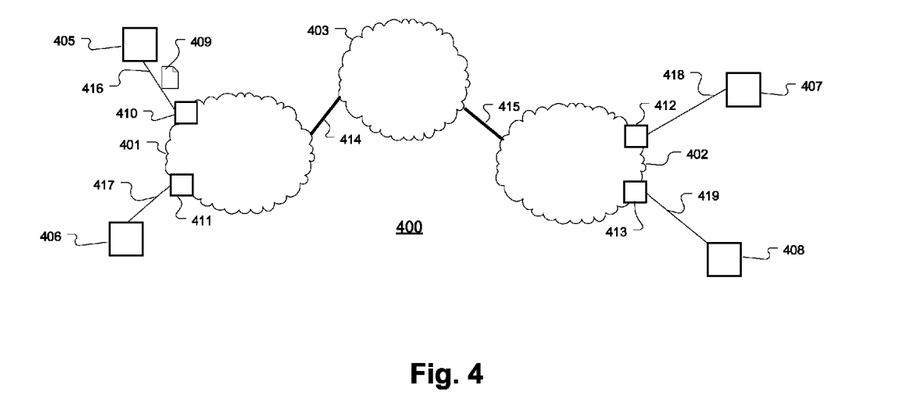
FIG. 4 shows a proposed hybrid message delivery system featuring distributed message filtering.

FIG. 4 shows a hybrid message delivery system 400 that combines the best features of the broker based message delivery system 100 and the brokerless message delivery system 200. The hybrid message delivery system 400 shares many of the same components of the two previously described message delivery systems 100 and 200. It features a series of server hosts 405-408 similar to 102-105 of FIG. 1 and 202-205 of FIG. 2. The network 401-403 is shown in three segments however is made of similar components and performs a similar function to 101 and 201. In the message delivery system depicted in FIG. 4 the matching/filtering function 410-413 that matches message topics to interests is explicitly separated from the server hosts 202-205 where it is located in the brokerless message delivery system 200 and from the message broker 106 where it is located in the broker based message delivery system 100. Distributing the matching/filtering function 410-413 around to the edges of the network 401-403 in locations that allow for acceleration by implementation in specialized hardware is the key feature of the hybrid message delivery system 400.

The present invention involves adding additional functionality to the switches that make up the network 401-403. The new functional blocks implement the matching/filtering function 410-413. Of note is the fact that the matching/filtering function 410-413 only needs to be deployed on the links 416-419 connecting to participating server hosts 405-408; the network 401-403 has been drawn in three sections to show this. The first network block 401 is built with enhanced switches that are enabled with the matching/filtering function 410-411 on the links 416-417 that connect to server hosts 405-406 that are participating in the hybrid message delivery system 400. Network block 403 is built with standard switches that are not enabled with the matching/filtering function 410-413. Link 414 connects network block 401 to 403, note that it does not have a matching/filtering function 410-413 on either end and furthermore one is not required on either end because link 414 is not connected to any of the server hosts 405-408 that are a part of the hybrid message delivery system 400. Network block 402 is similar to 401 and link 415 is similar to 414; the important point is that the network 401-403 of the hybrid message delivery system 400 can be built from a combination of standard and enhanced switches provided that enhanced switches are deployed with the matching/filtering functions 410-413 on the ports that connect to the server hosts 405-408.

The preferred embodiments of the present invention will be presented in the following description of a path taken by a message 409 as it traverses the hybrid message delivery system 400 and later by a detailed description of the devices and protocols employed. As in the two previously described message delivery systems 100 and 200, an application 304-307 residing on server host 405 generates a message 409 for transport over the hybrid message delivery system 400 to destination applications 304-307 residing on one or more of the other participating server hosts 406-408. The sending application 304-307 passes the message 409 to the messaging layer 303 via an API call. As in the previous two example message delivery systems 100 and 200, the messaging layer 303 is software code that provides an API by which an application 304-307 can send and or receive messages. In the example of FIG. 4 the messaging layer 303 on server host 405 is responsible for receiving a message 409 generated by an application 304-307 and formatting or framing it in such a way that it can be transmitted over the network 401-403 and extracted by a receiving system. This may include adding a topic to the message 409 that may have been passed to the messaging layer 303 via the API. As in the previously described message delivery systems 100 and 200 the topic could be a string, a string with hierarchical sub fields, a number, a programming language "object" or there could be no topic and characteristics of the message itself could be used to determine the destinations; or if the message delivery system 100 is implementing point to point messaging then the messaging layer 303 must add the address of the destination system. Similarly if the content of the message 409 is used by the message delivery system 400 to determine the destination systems then the messaging layer 303 must only ensure that the message is framed in such a way that destination systems can extract the message 409. It is important to note that as in the previous examples there may be other optional control information added to the message 409 by the messaging layer 303 that is used by the message delivery system 400 to enable more advanced features.

The processing performed on the sending server host 405 in the present example of FIG. 4 is very similar to that on the sending server host 202 in the example brokerless message delivery system 200. Once the messaging layer 303 has finished framing and formatting the message it is sent on to the networking stack 302 for transmission on a predetermined multicast group. The network 401-403 as in the previous example message delivery systems 100 and 200 consists of one or more devices commonly known in the art as switches. Also, as described in previous examples, is the network interface 301; a hardware device that has a connection to the network switch (es) that make up the network 401-403. The connection between the network interface 301 and the network 401-403 may be optical cable, copper cable or wireless.

The hybrid message delivery system 400 makes use of multicast networking technologies in a similar manor to the brokerless message delivery system 200. The network stack 302 and network interface will address the message to all of the destination server hosts 406-408 making use of the multicast addressing facilities provided by the network 401-403. The hybrid message delivery system 400 may optionally associate a subset of the topics or message types with a particular multicast group or address in order to segregate network traffic; if this is the case then it is the responsibility of the messaging layer 303 to instruct the network stack 302 to address the message to the correct multicast group.

The network 401-403 is responsible for replicating the packet(s) that contain message 409 and delivering it to the matching/filtering function 411-413 corresponding to the subset of the destination server hosts 406-408 that have joined the multicast group on which message 409 was sent.

The applications 304-307 will have previously communicated their interests in terms of what types of messages 409 they wish to receive to the matching/filtering function 410-413 via a control connection similar to the way in which they communicated their interests to the message broker 106 in the example broker based message delivery system 100 previously described. The control connection is preferably a TCP connection to a control plane application associated with the matching/filtering function 410-413 but maybe made by any reliable means of communication. Alternately another controlling entity could configure the interests in the matching/filtering function 410-413 on behalf of the receiving application(s) 304-307. The interests of the applications 304-307 similar to the two previously described message delivery systems 100 and 200 are in the form of topic strings or hierarchical topic strings either of which may or may not contain wild cards or other forms of regular expressions. The topics could also be in the form of numbers and the interests in the form of matching numbers or ranges of numbers; or in some implementations the interests describe characteristics of the message content. Alternately the interests may be in the form of topics or topics including regular expressions for which the application is not interested in receiving, in this case a negative interest may be referred to as a filter. All forms of matching messages to the interests of applications or removing unwanted messages from a message stream for a specific application are covered within the scope of the invention.

Upon receiving a message 409 the matching/filtering function 410-413 will compare the topic of the message 409 or the message content to the interests that it has collected from the applications 304-307 hosted by the server host 405-408 that it is connected to. It is preferable for performance reasons that the matching/filtering logic 410-413 to be implemented using hardware devices such as ASICs, FPGAs or network processors as they are known in the art; it may also be implemented in software on a general purpose processor. The network switches are multi-ported devices as such it may be more cost effective to implement the matching/filtering function 410-413 for multiple ports of the same switch in the same physical hardware to provide economies of scale; techniques for logically partitioning the hardware for each switch port are well known to those skilled in the art. If a match is detected by the by the matching/filtering function 410-413 then the packet containing the message for which the match was detected will be transformed and forwarded to the application 304-307 that registered the matching interest. Note that depending on the implementation of the hybrid message delivery system 400 there may be multiple applications 304-307 on the same server host 405-408 which may have registered a matching interest for the same message 409; in this case the matching/filtering function 410-413 must send a copy of the message 409 to each of the applications 405-408 that registered a matching interest. Techniques for handling these specific cases will be detailed in subsequent sections. Some implementations of the two previously described message delivery systems 100 and 200 may allow multiple messages 107 and 206 to be transported in a single network packet; in the hybrid message delivery system 400 one of the design goals is not to burden the destinations with messages 409 that they are not interested in receiving; these unwanted messages should be removed from the message stream. Techniques for removing unwanted messages will also be detailed in subsequent sections.

The messages 409 for which the matching/filtering function 410-413 detected a matching interest are forwarded to the destination application(s) 304-307 via the corresponding server host 406-408 for which the matching interest(s) were detected. The network interface 301 and networking stack 302 will forward the message 409 up to the messaging layer 303 where it will be distributed to the application 304-307 with the matching interest. Of note is that unlike the brokerless message delivery system 200, the messaging layer 303 does not need to inspect the message 409 or the message topic and compare it to the interests it has collected from the applications 304-307 it is hosting. Also of note that unlike the broker based message delivery system 100, there is no intermediate broker 106 that must receive and process the message 409 before forwarding it on to its destination(s).

The hybrid message delivery system 400 can optionally provide acceleration to the previously described IPC use case as follows. As in the previous example server host 405 generates and sends message 409 to the network 401-403. If the matching/filtering function 410 corresponding to server host 405 has collected an interest from one of the applications 304-307 aside from the one that generated message 409 in receiving messages of the same type as 409 then after forwarding message 409 on to other network 401-403 the matching/filtering function 410 will retain a copy of the message 409 and process it as would any other message received from the network 401-403. For any interests collected from applications 304-307 that are found to be a match to the current message 409 a copy of the message 409 can be forwarded back to sending server host 405 and addressed to the application 304-307 that registered the matching interest. By employing these techniques the hybrid message delivery system 400 can provide the benefit of offloading the task of matching interests to messages from the applications 403-407 in the IPC case as well as the normal case. Modern server hosts have multiple processing cores and applications that are extremely latency sensitive are often purposely co-located. In these cases the benefits of offloading the task of matching interests to messages may be outweighed by the latency incurred by sending the message to an off box matching/filtering function 410-413.

Figure 5:
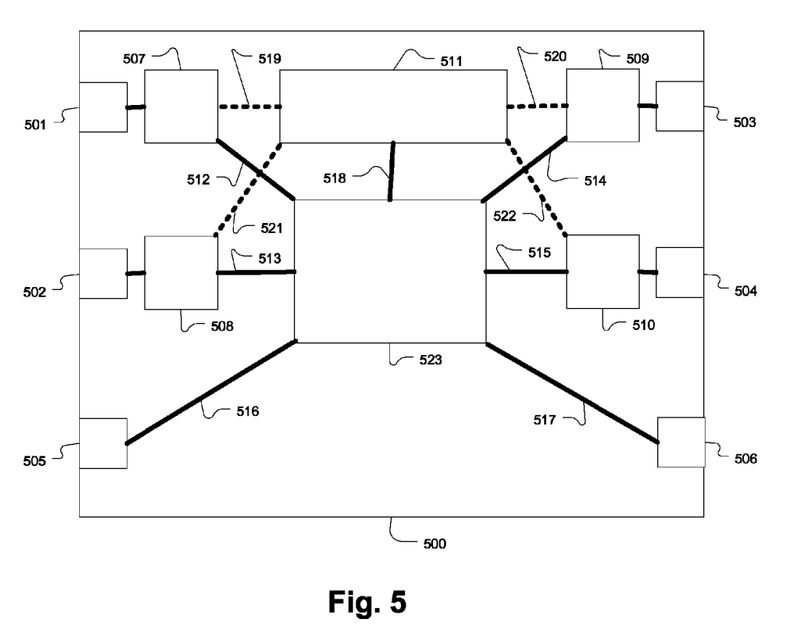
FIG. 5 shows a block diagram of and enhanced network switch suitable for deployment in a hybrid message delivery system.

FIG. 5 shows an example implementation of an enhanced network switch 500 of a type that could be used to implement network segments 401 and 402 of the hybrid message delivery system 400 of FIG. 4. It features six ports 501-506, with a mixture of standard ports 505-506 suitable for connection to other switches or non-participating server hosts and enhanced ports 501-504 that are equipped with matching/filtering logic 507-510. These enhanced ports 501-504 are suitable for connection to server hosts that are participating in a hybrid message delivery system 400. The ports 501-506 may be electrical or optical and of different speeds depending on which standard(s) the enhanced switch 500 is implementing. The switch core 523 is a standard piece of logic present in any network switch such as an Ethernet switch or Infiniband switch. In addition to the circuitry implementing the matching/filtering logic 507-510 the enhanced network switch 500 needs some additional control logic 511 beyond what would be present in a standard network switch for the purpose of configuring matching/filtering logic 507-510 with the interests gathered from applications 304-307.

The ports 505-506 are typical of a standard network switch where the switch core 523 connects logically if not physically directly to the ports 505-506. In the case of the enhanced ports 501-504 there is a new functional block inserted into the path implementing the matching/filtering logic 507-510; in FIG. 5 this is shown as four discreet blocks but could be implemented in the same physical device to reduce cost. Conversely the control logic 511 is drawn in FIG. 5 as a central block but could be implemented as a number of discreet elements co-located with the matching/filtering logic 507-510. The matching/filtering logic 507-510 is intended to operate in a flow through mode of operation where normal network traffic, not associated with the hybrid message delivery system 400 passes through unimpeded and traffic associated with the hybrid message delivery system 400 is operated on as will be described in subsequent sections. The matching/filtering logic 507-510 is most efficiently implemented in a hardware device such as an FPGA or ASIC as they are known to those skilled in the art but, may also be implemented with software running on a network processor or general purpose processor although with less efficiency. The control logic 511 as shown in FIG. 5 has a connection 518 to the switch core 523 and is reachable as a network host; this is not required but provides an efficient way for the server hosts 405-408 to communicate information such as interests etc. with the control logic 511. This communication could take place over a TCP connection between the control logic 511 and the applications 304-307 or some other form of reliable network communication. The dashed lines 519-522 are a channel physical or logical used by the control logic 511 to configure the matching/filtering logic 507-510. As previously stated it is not required for the control logic 511 to be centrally located and connected to the network via a dedicated link 518; it could equivalently be co-located or embedded within the matching/filtering logic 507-510.

As previously stated, the matching/filtering logic 507-510 could be implemented in one or more physical devices; stated another way, the matching/filtering logic 507-510 for multiple ports 501-504 could be implemented in the same device. There is another possible design for the enhanced network switch 500 where the matching/filtering logic is combined with the control logic 511 as it is shown in FIG. 5. In this implementation, the traffic associated with the hybrid message delivery system 400 is routed from the ports 501-506 through the switch core 523 to the matching/filtering logic that is co-located with the control logic 511 (or separate but similarly connected by a dedicated switch port via an internal link similar to 518). After processing by the matching/filtering logic the message traffic is forwarded to the correct egress port. This implementation has the disadvantage that the message traffic must pass through the switch core 523 twice adding latency and is not the preferred implementation however is still covered within the scope of the present invention.

Figure 6:
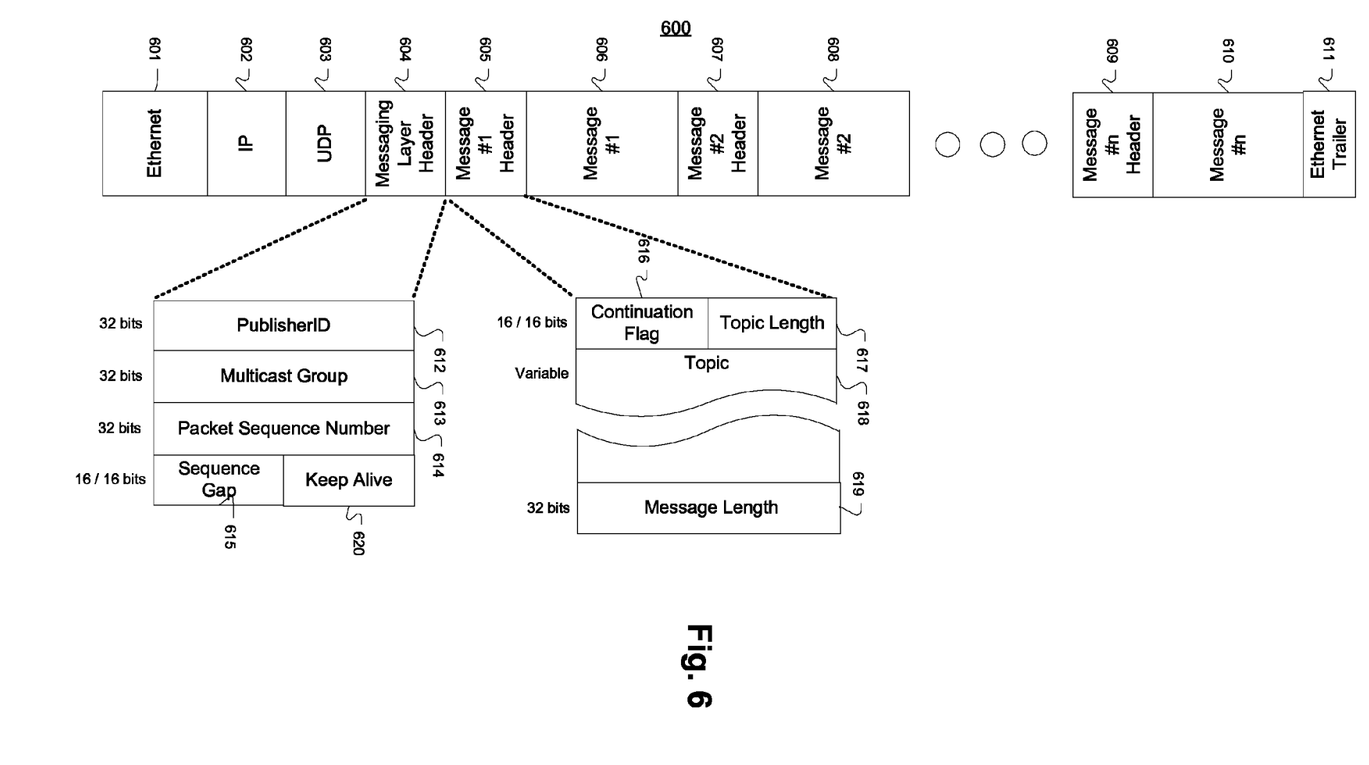
FIG. 6 shows a proposed packet format suitable for use in a hybrid message delivery system.

FIG. 6 depicts an example network packet that is suitable for carrying message data in the hybrid message delivery system of FIG. 4. The example packet 600 uses Ethernet and UDP/IP multicast to transport the message data. The Ethernet standard is defined by the IEEE in their 802.3 family of specifications. IP/UDP and IP multicast protocols are specified by the IETF in the RFC series of specifications and are well known to those skilled in the art. The Ethernet frame includes the Ethernet header 601 and Ethernet trailer 611, the rest of the frame 602-610 is considered Ethernet payload. The Ethernet header contains source and destination addresses and it is these addresses that the switches in the network 401-403 operate on. Also note that the switch core 523 of the enhanced Ethernet switch 500 uses the Ethernet addresses to determine how to switch a network packet 600 toward output port(s). The Ethernet payload can be between 46 and 1500 bytes but, some Ethernet switches support jumbo Ethernet frames up to 9 kilobytes. The length of the Ethernet frame is significant because it determines how many messages 606, 608 and 610 a frame can carry. It is a requirement of most message delivery systems to be able to carry large messages in excess of the maximum Ethernet frame size; higher layer protocols must be capable of carrying messages that span multiple Ethernet frames. The Ethernet trailer 611 contains frame check sequence that can detect errors inserted during transmission. The network 401-403 and the network interface 301 primarily operate on the Ethernet portion of the packet. The network stacks 302 on the server hosts 405-408 of hybrid message delivery system 400 operate on the IP 602 and UDP 603 portions of the packet 600.

The IP header 602 contains its own source and destination addresses similar to the Ethernet header 601 however, the IP addresses are globally routable, the Ethernet addresses are only significant within the local network. Global routability is not required however IP networking is ubiquitous, supports multicast and the UDP layer offers a method of sending network data to a particular application on a host making IP/UDP a good choice as a transport layer for the hybrid message delivery system 400. Infiniband and other network protocols have equivalent protocol stacks and could also be used. The hybrid message delivery system 400 uses the multicast addressing feature of IP. IP multicast addresses are not generally routable over the public internet and must be assigned by a local network administrator. If multiple IP multicast groups are to be used in the implementation of the hybrid message delivery system 400 then the system administrators must determine which topics are to be transported on which multicast groups.

IP multicast addresses are in the range 224.0.0.0 to 239.255.255.255, this is a range of approximately 268 million addresses; practically only a few thousand are available for use in the hybrid message delivery network 400. In hexadecimal the multicast IP addresses are in the range of E0:00:00:00 to EF:FF:FF:FF or a range of 28 bits. When using Ethernet to carry IP multicast traffic, the Ethernet MAC addresses will be in the range of 01:00:5E:00:00:00 to 01:00:5E:7F:FF:FF, a range of 23 bits. The lower 23 bits of the multicast IP address are used as the lower 23 bits of the MAC address. If there are two IP multicast groups that share the same lower 23 address bits then any Ethernet attached hosts that wish to receive the traffic from either IP multicast address will receive all the traffic sent to both groups and it will be up to the network stack 302 on the host to remove and discard the unwanted data. For efficiency reasons it is preferable to avoid the previously described scenario and most network administrators would assign their IP multicast groups such that their addresses differ only in the lower 23 bits. The number of usable multicast groups is further limited to a few thousand by the number of multicast groups that the network switches can support. An IP host indicates its interest in receiving traffic from an IP multicast address by issuing an IGMP join message; network switches will typically snoop these messages in a process known as IGMP snooping and use this data to build a multicast forwarding table. The data stored in the multicast forwarding table is used to only send data with the corresponding multicast MAC address to those ports that have attached hosts that have expressed an interest in receiving data from that particular multicast group. The only alternative is for the network switches to send multicast data to all ports and force the hosts to process it and filter off data sent on multicast groups for which it has no active listeners. Network switches currently available are not able to support all $2^{23}$ possible Ethernet multicast addresses and are typically limited to a few thousand; based on this limitation the hybrid message delivery system 400 cannot use a one to one mapping between topics and multicast groups. Put another way, in the hybrid message delivery system 400 each multicast group must be able to carry messages 409 for more than one topic in order to meet the requirements for topic scalability. Aside from the limitation in terms of the size of the multicast forwarding table supported by current network switches, an implementation whereby there is a one to one mapping between the topic and multicast address has other scaling issues. The mapping of multicast addresses to topics becomes difficult to manage as the size of the topic space increases and support of interests that include wild cards or regular expressions requires that all participating applications have knowledge of the entire topic space. The methods described in the present invention support interests that include wild cards and allow sending applications to create topics dynamically without the need to maintain an up to date copy of the entire topic space in every participating application. The size of the topic space for a hybrid message delivery system 400 could scale to millions of topics.

The messaging layer header 604 contains the PublisherID 612 of the application 304-307 that generated the packet 600. Each application 304-307 that wants to generate and send messages over the hybrid message delivery system 400 must have a unique PublisherID 612 assigned to them; this could be done by a controlling application, a system administrator or by the application itself. Without a PublisherID 612 in each packet 600 there would be no way for receiving systems to know which application 304-307 generated a particular packet 600 and therefore no way to detect lost messages as will be described. Those skilled in the art will see that there are possible alternate implementations that don't contain a publisherID 612 in the messaging layer header; for example the source IP address and source UDP port could be used to uniquely identify a message's source application. If message loss is detected, by mechanisms to be described subsequently, the receiving application(s) 304-307 must have enough information to uniquely identify the message's source application and the multicast stream which it came from so that a retransmission of the missing data can be requested from the source.

In addition to the PublisherID 612 the messaging layer header contains the multicast group 613 on which the packet 600 was sent. The multicast group is also contained in the destination address field of the IP header 602 but is included again in the messaging layer header 604 to allow for implementations where the routing/filtering function 410-413 over writes the destination IP address in the process of generating a unique message stream for each receiving application 304-307. As was stated previously the multicast group 613 is required by receiving applications 304-307 so that they can request retransmissions from source in the event of message loss. The publisherID 612 is not sufficient to identify the source stream of a message as a single application 304-307 may publish to topics carried by more than one multicast group.

The packet sequence number 614 is the primary loss detection mechanism; it uniquely identifies a packet 600 sent by a particular application (or publisherID 612) to a particular multicast group 613. The matching/filtering function 410-413 is downstream of the publishing application 304-307 and may remove messages that its subtending receiving application(s) 304-307 are not interested in processing. If the matching/filtering function 410-413 removes an entire packet 600 from the message stream then it must have a mechanism to communicate this information to the receiving application 304-307. The sequence gap 615 provides this mechanism. It indicates the number of packets 600 that were intentionally removed from the stream since the last packet 600 was sent. In order for end-to-end loss detection mechanisms to function every packet 600 must be accounted for.

The keep-alive field 620 is a flag utilized by a keep-alive protocol to indicate that this packet 600 should be sent to all applications 304-307 that are listening to a particular multicast group 613. This is a part of a higher-level keep-alive protocol; the goal of which is to maintain a minimum packet rate to all applications. The loss detection mechanisms depend on a constant flow of packets 600 from all publisherIDs 612 on each multicast group 613 to which they are sending messages to function effectively. The keep-alive protocol ensures this.

A network packet 600 may contain one or more messages 606, 608 and 610, each of which must contain a message header 605, 607 and 609. Contained within the message header 605, 607 and 609 is a continuation flag 616, a topic length field 617, a topic 618 and a message length 619. The continuation flag 616 is used to indicate that this particular message 606, 608, 610 is a continuation of the previous message sent in the previous packet 600 from the same message stream. Alternately it could be viewed as a start of message indicator. In this example implementation the continuation flag 616 is shown as a sixteen bit field; only one bit is required to convey this information. The remaining fifteen bits could be used in the implementation of advanced features beyond the scope of the present invention. The topic length 617 is the length in bytes of the topic 618. The topic 618 is a variable length field; the topic length 617 is included to enable a parser to locate the next field in the message header 605, 607, 609. In this implementation the next field in the message header 605, 607, 609 is the message length 619; similar to the topic length 617 the message length 619 is the length of the message 606, 608, 610 in bytes and is required to enable a parser to find the start of the next message header 605, 607, 609 in the packet 600. The following description of a packet walk through including the operations performed by each of the intermediate systems on the protocol fields will illustrate the preferred embodiments of the invention. A sending application 304-307 creates a message content 606, 608, 610 and a topic 618. This data is passed to the messaging layer 303 via a send call to the messaging layer API. The messaging layer 303 will take the message content 606, 608, 610 and topic 618 and proceed to assemble the messaging layer header 604 and the message header 605, 607, 609. Based upon which multicast group the topic 618 is transported on and which application 304-307 made the send call the messaging layer 303 must look up the PublisherID 612 and the next packet sequence number 614. Based on the information received from the send call and the subsequent lookup the messaging layer 303 can assemble the messaging layer header 604, the message header 605, 607, 609 and the message 606, 608, 610. The sequence gap field 615 should be zero; this field is to be operated on by the matching/filtering logic 507-510 in a subsequent step and is included here as a place holder. Before making the call to the network stack 302 to generate a packet 600, the messaging layer 303 may choose to combine the message with one received by a previous send call from the same application 304-307 or wait for a subsequent send. There is some cost in terms of CPU cycles associated with generating and receiving a network packet 600; there can be some advantage to packing multiple messages 606, 608, 610 into a single network packet 600. However waiting for the application to generate multiple messages 606, 608, 610 adds latency to the delivery of all but the last message sent which in many instances is deemed a larger problem than increased CPU utilization and so most systems will endeavor to send the messages 606, 608, 610 as quickly as possible. Once the messaging layer frame which includes the messaging layer header 604, the message headers 605, 607, 609 and the message content 606, 608, 610 its total length must be checked to make sure that it does not exceed the maximum length supported by the network 401-403 also known as the maximum transmission unit or MTU. If it exceeds the MTU then it must be broken into at least two packets 600. The message header 605, 607, 609 of the message that is severed must be replicated and then modified by setting the continuation flag 616 before inclusion in the second packet 600. The messaging layer header 604 of the second packet 600 will be the same as the previous packet however the packet sequence number 614 will be incremented by one. It is possible that the message will have to be further subdivided if the length of the remaining part of the message plus headers still exceeds the network MTU; in this case the previously described process will be repeated until the final segment of the message fits within a packet 600 that does not exceed the network MTU. At this point, the messaging layer 303 may send the content of the first packet 600 to the network stack 302. New messages may be added after the final segment of the current message if desired before sending the packet 600 to the network stack 302.

It is important to note that one of the features of the hybrid message delivery system 400 is that the communication is to be reasonably resilient and must include mechanisms to retransmit messages 409 that are contained in packets 600 that are discarded by the network 401-403 to any or all of the interested receiving server hosts 405-408. Protocols that accomplish this are well known in the art as reliable multicast protocols; typically they are based on a system of negative acknowledgements or NACKs and require the sending system to hold recently sent data for a period of time. The NACKs may be sent point to point or multicast back to the sender; similarly retransmitted data may be sent point to point or multicast back to the receiving systems. The primary message delivery path is the main focus of the present invention however the hybrid message delivery system 400, similar to the brokerless message delivery system 200, requires a secondary message delivery mechanism to recover from data loss in the network 401-403. Other known reliable multicast systems have previously developed these techniques and they are equally applicable to the hybrid message delivery system 400 of the present invention. While the protocols to request and redeliver lost data are not critical to the present invention, mechanisms to detect data loss are required to enable the retransmission protocols to work. In the exemplary implementation of the present invention the loss of one or more packets 600 can be detected using the packet sequence number 614 and sequence number gap 615. Upon detecting packet loss the messaging layer 303 of a receiving host 405-408 can identify the source of the lost data by the source address in the IP header 602, the publisherID 612 and multicast group 613. Once the source of the lost packets 600 has been identified retransmission of the missing packet sequence numbers 614 can be requested.

There are two possible places where data could be lost in the hybrid message delivery system 400, in the network 401-403 including the sending server host 405-408 and between the matching/filtering function 410-413 and the receiving application 304-307. The mechanism for detecting loss in the network 401-403 is the packet sequence number 614. The matching/filtering function 410-413 must store the last packet sequence number 614 for every PublisherID 612 and multicast group 613 in the hybrid message delivery network 400. If the packet sequence number 614 for a newly received packet 600 is not exactly one greater than the last packet sequence number 614 stored for the sending PublisherID 612 and multicast group 613 then the retransmission mechanisms must be triggered for the missing packet(s) 600 as will be discussed in a subsequent section. The second loss detection mechanism is between the matching/filtering function 410-413 and the receiving applications 304-307 and is complicated by the matching/filtering function 410-413 that is intentionally removing messages and sometimes packets from the stream that it is sending to a given application 304-307. The simple sequence number mechanism previously described no longer works. In this case when the matching/filtering function 410-413 sends a packet 600 to an application 304-307 it also sends with it an expected sequence number gap 615. The receiving application 304-307 must store the packet sequence number 614 of the last packet 600 it received from the current PublisherID 612 and multicast group 613. The last received packet sequence number 614 plus the sequence number gap 615 should be exactly one less than the packet sequence number 614 of the current packet 600. If the previously described check fails the lost packet(s) 600 will need to be retransmitted. In this case the exact missing packet sequence numbers 614 are not known, only that some packet(s) were lost between the last received packet sequence number 614 and the current packet sequence number. This information is sufficient to recover the lost packet(s) 600 from source.

Most message delivery systems also feature a keep-alive protocol to communicate the status of applications 304-307 and to aid in the detection of data loss. The hybrid message delivery system 400 is no different; sending applications are required to periodically send keep-alive messages so that other receiving applications 304-307 know whether or not they should continue to maintain state for a particular PublisherID 612. Aside from helping applications 304-307 keep track of active PublisherIDs 612 the keep-alive protocol solves two problems in the hybrid message delivery system 400; the first is that it limits the size of the retransmission buffer that a sending application 304-307 must keep and two it helps detect the loss of the last message sent in cases where a particular PublisherID 612 has not sent a message 409 for a period of time. The loss detection mechanisms previously described and typically used by reliable multicast messaging systems cannot detect message loss until a message after the lost one is received; what if the lost message is the last one sent? In the case of the hybrid message delivery system 400, gaps in sequence numbers are intentionally being introduced between the matching/filtering function 410-413 and the applications 304-307; what if a message is lost between matching/filtering function 410-413 and the application 304-307 followed by a long intentional period of inactivity in the message stream from the publisher? In this case it may be a long time before the message loss is detected and the sending PublisherID 612 may have to save messages for a very long time in order to satisfy the retransmission protocols; consuming a lot of resources in the sending applications 304-307. The introduction of a keep-alive protocol running over the hybrid message delivery system 400 will address these issues. The keep-alive protocol is simple: every sending application 304-307 or publisherID 612 is required to send a packet 600 with the correct next sequence number periodically on each multicast group 613 on which it is sending messages. The period may be time based or it may be after a certain number of packets are sent or both and in most systems would be configurable by system administrators. The keep-alive messages have the keep alive flag 620 set so that they can be identified by the matching/filtering function 410-413. The keep-alive messages would be forwarded to the messaging layer 303 of all receiving server hosts 406-408 that are hosting applications 304-307 that are listening to a particular multicast group 613. This would provide a constant stream of messages to all receiving applications 304-307 and periodically reset all of data loss detection mechanisms of the messaging layer 303. Note that in order to reset the packet loss detection mechanisms the matching/filtering function 410-413 must insert the correct sequence gap 615 into each keep-alive packet 600 that is generated.

The messaging layer 303 communicates with the network stack 302 using the sockets API as it is know in the art. The present invention does not require the use of the sockets API however it is a convenient choice since this API is commonly used with IP multicast over Ethernet networks as in the present example. If the underlying network 401-403 in the example was based on Infiniband technology then the Openfabrics user space verbs interface would be the most convenient choice for the messaging layer 303 to use to send and receive packet data to and from the network stack 302. Once the content of the packet 600 has been decided upon by the messaging layer 303 as previously described it is easy for those skilled in the art to see how to use the socket interface to send the packet to the multicast group. Which multicast group to use or which topics are associated with a particular multicast group must be decided upon by a higher layer protocol or configured by a system administrator and is not relevant to the present invention. It is the responsibility of the network stack 302 to transfer the now fully assembled packet 600 including Ethernet, IP and UDP headers to the network interface 301. Note that it is possible within the scope of the present invention to optionally use a network interface card 301 that includes hardware acceleration of some parts of the network stack 302 in order to further reduce latency. This technology is known to those skilled in the art as kernel bypass or TCP offload and is optionally included with some Ethernet and Infiniband network interface cards 301.

The packet 600 is sent over the network 401-403 (shown in FIG. 4 as message 409 but may contain multiple messages) to the matching/filtering function 410-413 corresponding to each of the server hosts 405-408 that have indicated an interest in receiving messages sent to a topic associated with the multicast group to which the packet 600 was sent. The network 401-403 will replicate the packet 600 as required to deliver a copy to any and all ports on which it received an IGMP join request for the multicast group to which the packet 600 is addressed with the exception of the port on which the packet 600 was originally received. Note that the switch core 523 of a modern network switch 500 can replicate multicast packets 600 with very high efficiency.

Prior to the matching/filtering logic 507-510 delivering any messages 409 to applications 304-307, a series of control interactions must take place between the applications 304-307 and the control logic 511 of the enhanced network switch 500. Before an application 304-307 can receive any messages 409 from the hybrid message delivery system 400 it must connect to the control logic 511 of the enhanced network switch 500 to provide the details of what topic interests it has as well as some details about how it would like to receive the messages. The application 304-307 preferentially establishes a TCP connection to the control logic 511; if there is more than one application 304-307 on a particular server host 405-408 then each application 304-307 must have a unique connection to the control logic 511. Over the control connection an application 304-307 will send a list of interests and associated multicast group addresses to the control logic 511 along with a UDP port number on which the application 304-307 is listening. The UDP port number must be unique among applications 304-307 that are running on a single server host 405-408. After gathering this information the control logic 511 must program the matching/filtering logic 507-510 such that it can compare the topic 617 of any received messages 606, 608, 610 with the interests gathered from the applications 304-307.

The switch core 523 will have snooped any IGMP join messages that were sent by hosted applications 304-307 and will forward a copy of any packet 600 with the matching multicast address to ports connected to those server hosts 405-408. The matching/filtering logic 507-510 will receive (or intercept) the packet 600 prior to it being sent to the server host 405-408. The matching/filtering logic 507-510 will inspect the IP header, looking for a destination IP address that matches one of the ones for which it has collected interests for one or more of its applications 304-307. If the destination IP address is a match then the matching/filtering logic 507-510 will begin to parse the rest of the header in the packet 600.

First it will extract the PublisherID 612. Every application 304-307 in the hybrid message delivery system 400 has a unique PublisherID 612. The matching/filtering logic 507-510 must maintain state for all possible PublisherIDs 612 and so must be aware of them; this could be configured by a higher level control application or the PublisherIDs 612 could be learned dynamically. The matching/filtering logic 507-510 will use the PublisherID 612 and the multicast group 613 as a key to a lookup table containing the sequence number of the last packet received on that multicast group 613 from that PublisherID 612. The sequence number resulting from the lookup should be one less than the packet sequence number 614 contained in the packet 600. If the packet sequence number 614 fails this check then there has been data loss in the network 401-403 and one of the reliable multicast protocols known in the art can be used to recover the lost data.

If packet loss is detected in the network by the matching/filtering logic 507-510, the reliable multicast protocols to recover the lost data could be implemented by the matching/filtering logic 507-510 or the messaging layer 303. If the messaging layer 303 is to implement the reliable multicast protocol then a copy of the packet 600 with the incorrect next sequence number 614 and a sequence number gap 615 of zero is forwarded to each application 304-307 that has joined the multicast group 613. The matching/filtering logic 507-510 should process a copy of the packet 600 for each application 304-307 as will be described but it should send a packet 600 even if it contains no messages 606, 608, 610 after the filtering function is performed. This is to trigger the message retransmission mechanisms as soon as possible. Furthermore the matching/filtering logic 507-510 should take steps to prevent applications 304-307 from requesting more data retransmission than is actually required. If the matching/filtering logic has introduced any intentional packet sequence number 614 gaps then before forwarding the current packet 600 the matching/filtering logic 507-510 should generate a packet that contains the last correctly received packet sequence number 614 and the correct sequence number gap 615 for each application listening to the multicast group 613. Applications 304-307 for which the matching/filtering logic 507-510 had intentionally introduced a sequence number gap will receive two packets 600. The first packet will contain the sequence number 614 and sequence number gap 615 for the last packet that the matching/filtering logic correctly received from publisher ID 612 and multicast group 613. This will bring the state that the applications 304-307 must keep for this publisher ID 612 and multicast group 613 up to date. The second packet 600 will contain the incorrect next sequence number as detected by the matching/filtering logic 507-510. Upon receiving the second packet 600 the applications 304-307 will perform their own packet sequence number 614 check. The applications 304-307 will not be able to tell where the packet loss occurred (in the network or between the matching/filtering logic 507-510 and the application) but will be able to use the sequence number 613 and sequence number gap 615 to detect loss. The application 304-307 will lookup the last sequence number received from the same publisherID 612 and multicast group 613 as the current packet 600. If the last packet sequence number 614 received plus the sequence number gap 615 does not equal the sequence number of the current packet then a retransmission of all packets between the two packet sequence numbers 614 must be requested.

If the packet sequence number 614 passes the previous check then the matching/filtering logic 507-510 can proceed to look for a match between the topic 618 of the first message 606 and the interests that the control logic 511 gathered from the applications 304-307 reachable via the corresponding port 501-504. There are three possible outcomes; no match, a match for one application 304-307 or a match for more than one application 304-307.

Figure 7:
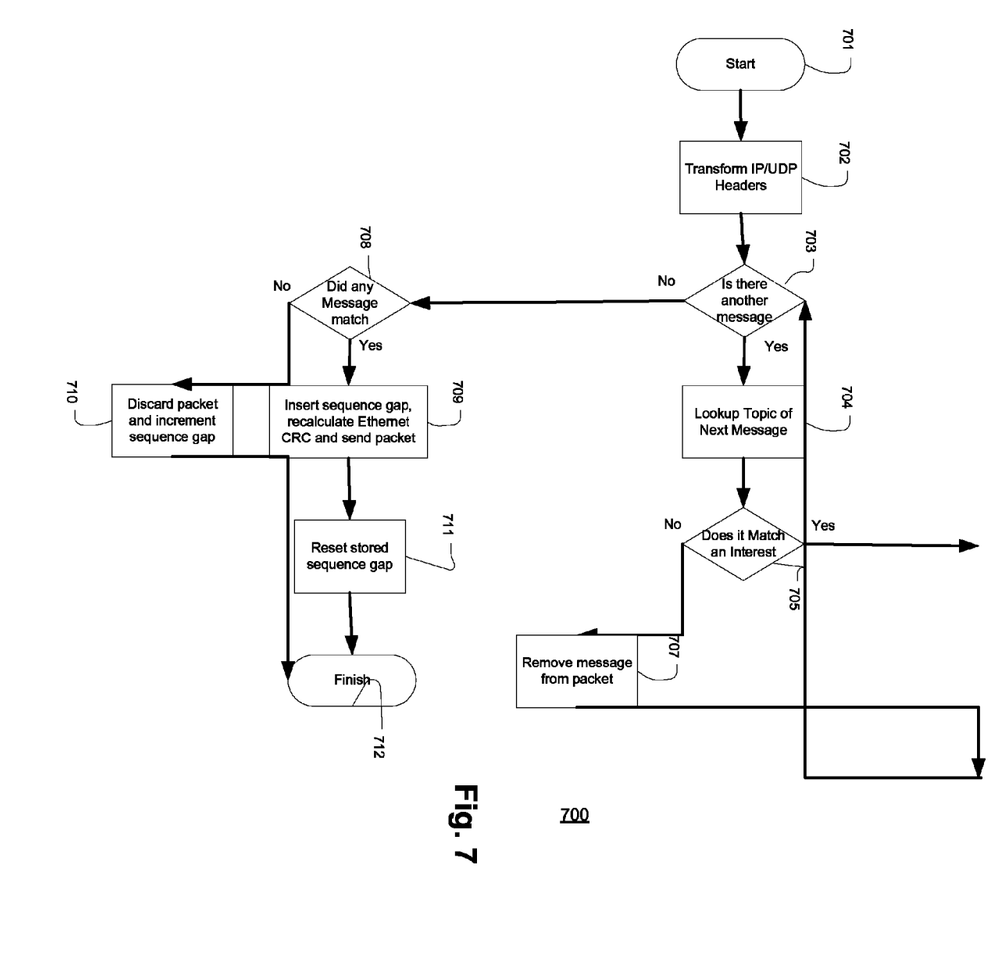
FIG. 7 shows a flow chart of the processing that must be performed by the matching/filtering function performed per packet and per application in the hybrid message delivery system.

FIG. 7 is a flow chart that describes the processing that takes place in the matching/filtering logic 507-511 for a single application 304-307. It should be noted that this processing must be performed for all applications 304-307 on the corresponding server host 405-408 and it may be more efficient in a hardware implementation to perform the topic matching for all applications 304-307 that could possibly have a matching interest in parallel. There is also some state that must be stored and accessed by the algorithm 700. For each application 304-307 the point to point addresses including Ethernet, IP and UDP destination port must be stored so that a unique custom tailored copy of each packet 600 may be sent to each application 304-307 by the algorithm 700. The series of custom tailored packets 600 forms a stream of messages from the PublisherID 612 to each application 304-307. Also for each application 304-307, PublisherID 612 and multicast group 613 tuple a sequence gap 615 must be maintained.

The processing begins at step 701 with a copy of the packet 600 as it is received by the matching/filtering logic 507-511 from the switch core 523. The headers are transformed to convert the packet 600 from multicast to point to point at step 702. The destination Ethernet address is modified to be the point to point address of the server host 405-408 corresponding to the matching/filtering logic 507-510; the destination IP address is similarly transformed from multicast to point to point. The transformation of the Ethernet and IP addresses will see that the packet 600 can be properly received by the network interface 301 and network stack 302 of the server host 405-408; the UDP destination port must also be transformed so that the network stack 302 can determine the correct application 304-307 to send the packet to.

Processing of the individual message headers 605, 607, 609 begins at step 703; the remaining steps of the algorithm are repeated for each message 606, 608, 610 that the packet 600 contains. The topic 618 from the message header 605, 607, 609 is matched to interests previously received from the application 304-307 that is currently being processed at step 704. Note that in this example matching of topics 618 to interests is described at step 704 but, matching of interests to any part of the message or meta-data describing it is applicable to the present invention. If any matching interests are found in step 704 then at step 705 the decision on whether or not to include the message 606, 608, 610 in the packet 600 is made. If a matching interest is detected the message 606, 608, 610 is to be included in the network packet 600 and the algorithm proceeds to the next message in the packet 600 at step 703. If no matching interest was detected at step 704 then the message 606, 608, 610 and its corresponding header 605, 607, 609 is to be removed from the packet 600 at step 707. After step 707 the algorithm returns to step 703. If there are no more messages 606, 608, 610 in the current packet 600 then proceed to step 708. At step 708 the algorithm tests to see if the packet 600 still contains any messages 606, 608, 610 after filtering off (or removing) all that are uninteresting to the current application 304-307. If there are no messages 606, 608, 610 remaining then the entire packet 600 is discarded at step 710. If the packet 600 is discarded at step 710 then the sequence gap 615 that is stored for this receiving application 304-307 against the publisherID 612 and multicast group 613 must be incremented and stored. If the current packet 600 still contains one or more message(s) 606, 608, 610 at step 708 then the sequence gap 615 stored at step 710 (for a previous network packet 600) is inserted into the messaging layer header 604 and the Ethernet, IP and UDP headers and the Ethernet trailer must be updated to reflect the changes made to the packet 600. The updates may include updating length fields, recalculating checksums and CRCs etc. Once the updates to the packet 600 are completed at step 709 it should be correctly formed and ready for transmission to the server host 405-408; further processing to take place on the server host 405-408 has been previously described. Once the network packet 600 has been sent the sequence gap 615 should be reset to zero and stored until the next packet 600 from the same publisherID 612 and multicast group 613 is received at step 711.

Those skilled in the art will be able to see other possible implementations that differ slightly in mechanics to the one described in the previous example packet format 600 and processing algorithm 700. For example one could imagine an implementation where a single copy of a packet containing messages is sent the server hosts 405-408 using the multicast address. In this implementation all applications would receive all messages or just those for which there is a matching interest for at least one application and a bit mask present in the header of each message could be operated upon by the matching/filtering function 410-413 to indicate to the applications 304-307 on a message by message basis which messages they have indicated an interest in processing. Such an implementation simplifies the implementation of the matching/filtering function 410-413 and ensures only one copy of a message is ever sent over the link but, it forces the applications 403-407 to inspect every message and potentially filter some out. It does however still accomplish the primary goal of offloading the application 403-407 of the task of matching messages to interests. In a variant of the alternate implementation, matching/filtering function 410-413 could remove all messages for which no matching interests are detected and the applications 304-307 could inspect the topics to see if they match any of their interests.

Figure 8:
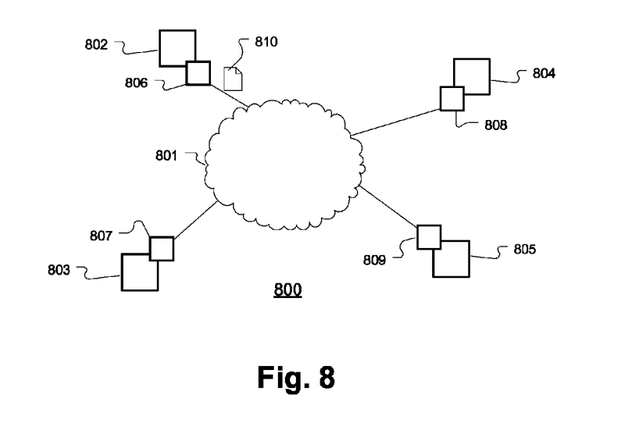
FIG. 8 shows an alternate implementation of a hybrid message delivery system.

FIG. 8 depicts an alternate implementation of a hybrid message delivery system; differing from that of FIG. 4 by the location of the matching/filtering function 806-809 in FIGS. 8 and 410-413 in FIG. 4. FIG. 8 shows a series of server hosts 802-805 corresponding to 405-408 of FIG. 4, a network 801 similar to 401-403 but drawn as a single segment because it can be constructed entirely from standard switches (unlike that of FIG. 4). The hybrid message delivery system 800 operates in a very similar manor to the system shown in FIG. 4 however the matching/filtering function 806-809 is embedded in server hosts 802-805 rather the network switches. In this implementation the matching/filtering function 806-809 could be added to the network interface 301; and could optionally be combined with other functions such as the network stack 302 and a significant portion of the messaging layer 303 processing to further offload the server hosts 802-805. An implementation of the matching/filtering function 806-809 in this example would be well suited to a network processor but could also be implemented in an FPGA or ASIC or general purpose processor. This implementation also lends itself well to enhancement with advanced features such as kernel bypass. The implementation of FIG. 8 is likely to be more expensive to deploy than that of FIG. 4 because additional components need to be added to every server host 802-805. In the implementation of FIG. 4 there is a one to one relationship between the matching/filtering function 410-413 and the server hosts 405-408 as with the system of FIG. 8. In the system of FIG. 4 the network 401-403 is implemented with network switches that are multi-ported devices presenting the opportunity to share the physical devices implementing matching/filtering function 410-413 across multiple server hosts 405-408. The opportunity to share components implementing the matching/filtering function 410-413 in FIG. 4 is expected to make its implementation less expensive; however the hybrid message delivery system of FIG. 8 would be capable of providing very high performance.

All references mentioned above are herein incorporated by reference.

We claim:

1. A message delivery system for delivering messages over a network, wherein the messages are carried over the network in packets, comprising:
 a plurality of server hosts, each server host running applications for originating and receiving messages, and comprising a messaging layer for framing and formatting messages originating from the applications, a network interface connected to the network, and a network stack that transmits the framed and formatted messages to a predetermined multicast group of server hosts on the network via the network interface;
 a plurality of switches interconnecting said server hosts and forming the network, wherein at least some of said switches on the edge of the network serving as ingress/egress switches are connected via links to the network interfaces of the respective server hosts; and
 distributed filtering/matching modules associated with but distinct from the respective server hosts and being deployed on said links; and
 wherein each filtering/matching module is configured to:
 a) register interests associated with the applications on the server host with which the filtering/matching module is associated;
 b) inspect packets received over the network for the server host with which the filtering/matching module is associated to match messages carried by the packets with the registered interests;
 c) remove any unmatched messages from the packets; and
 d) transform a multicast address in a header of a matched packet to a point-to-point address of the host server with which the filtering/matching module is associated and transform a destination port in the message to permit the network stack in the host server which the filtering/matching module is associated to determine a matching application to send the packet to; and
 e) forward packets carrying any matched messages to the server host with the filtering/matching module is associated for delivery to the applications having registered interests matching the messages.

2. A message delivery system as claimed in claim 1, wherein the filtering/matching modules are embedded in the ingress/egress switches on the edge of the network linked to the network interfaces of the server hosts.

3. A message delivery system as claimed in claim 2, wherein the ingress/egress switches comprise ports for connection to other network switches and enhanced ports for connection to the server hosts, and wherein the enhanced ports are associated with the embedded filtering/matching modules.

4. A message delivery system as claimed in claim 3, wherein the filtering/matching modules associated with the enhanced ports are controlled by common control logic reachable as a network host.

5. A message delivery system as claimed in claim 4, wherein the common control logic is reachable over a TCP connection.

6. A message delivery system as claimed in claim 1, where the filtering/matching modules are embedded as distinct entities in the network interfaces of the associated server hosts.

7. A message delivery system as claimed in claim 1, wherein the filtering/matching modules are configured to add a marker to the header of each matching message to indicate to the destination server host which applications running on the server host are interested in the message.

8. A message delivery system as claimed in claim 1, comprising a plurality of multicast groups, each associated with different sets of topics of interest, and wherein the originating applications are configured to identify sets of topics of interest in the messages and send the packets carrying the messages toward the destination server hosts forming part of the multicast group associated with the identified sets of topics of interest.

9. A message delivery system as claimed in claim 1, further comprising a control connection established between the applications on the server hosts and control logic for the associated filtering/matching modules for registering said interests.

10. A message delivery system as claimed in claim 9, wherein the control connection is a TCP connection.

11. A message delivery system as claimed in claim 1, wherein the filtering/matching modules are configured such that if they receive a message from an application on a server host with which they are associated, and another application on that server host has registered an interest in receiving the message, the filtering/matching modules retain a copy of the message and send it back to the other application on that server host.

12. A message delivery system as claimed in claim 1, wherein the filtering/matching modules are configured to match the interests within a topic field contained in the messages.

13. A switch for use in a message delivery system for delivering messages over a network, wherein the messages are carried over the network in packets, comprising:
   a plurality of ports, at least one of which is an enhanced port for connection to a local server host; and
   at least one filtering/matching module associated with the at least one enhanced port, said at least one filtering/matching module being configured to:
   a) register interests for applications on the local server host;
   b) inspect packets using multicast addressing received over the network for the local server host to match messages carried by the packets with registered interests;
   c) remove any unmatched messages from the packets; and
   d) transform a multicast address in a header of a matched packet to a point-to-point address of the local host server and transform a destination port in the message to permit the network stack in the host server which the filtering/matching module is associated to determine a matching application to send the packet to; and
   e) forward packets carrying any matched messages to the local server host for delivery to the applications having registered interests matching the messages.

14. A switch as claimed in claim 13, wherein the filtering/matching modules associated with the enhanced ports are controlled by common control logic reachable as a network host.

15. A switch as claimed in claim 14, wherein the common control logic is reachable over a TCP connection.

16. A switch as claimed in claim 13, wherein the at least one filtering/matching module is configured such that if it receives a message from an application on a local server host, and another application on that local server host has registered an interest in receiving the message, the filtering/matching module retains a copy of the message and send it back to the other application on the local server host.

17. A method of delivering messages over a network having a plurality of switches including ingress/egress switches attached to local server hosts, and wherein the messages are carried over the network in packets, comprising:
   receiving messages originating in supporting applications on the local server hosts;
   forwarding packets carrying the messages to the network via ingress/egress switches attached to the destination server hosts using multicast addressing;
   inspecting the packets in distributed filtering/matching modules associated with local server hosts to match messages received over the network for the local server host with registered interests associated with applications running on the local server host;
   removing any unmatched messages from the packets;
   transforming a multicast address in a header of a matched packet to a point-to-point address of the host server with which the filtering/matching module is associated and transforming a destination port in the message to permit the network stack in the host server which the filtering/matching module is associated to determine a matching application to send the packet to; and
   forwarding packets carrying the matched messages to the local server host for delivery to the applications having registered interests matching the messages.

18. A message delivery system as claimed in claim 17, wherein the filtering/matching modules add a marker to the header of each matching message to indicate to the local server host which applications in the group are interested in that message.

19. A method as claimed in claim 18, wherein the marker is a bit mask.

20. A method as claimed in claim 17, wherein the destination server hosts are arranged in a plurality of multicast groups, each associated with different sets of topics of interest, and the originating applications identify sets of topics of interest in the messages and send the messages toward the destination server hosts forming part of the multicast group associated with the identified topics of interest.

21. A method as claimed in claim 17, wherein the interests are registered in the filtering/matching modules via a control connection from the receiving applications.

22. A method as claimed in claim 21, wherein the control connection is a TCP connection.

23. A method as claimed claim 17, wherein if a message from an application on a local server host, and another application on that local server host has registered an interest in receiving the message, the filtering/matching modules retain a copy of the message and send it back to the other application on that local server host.

24. A method as claimed in claim 17, wherein the filtering/matching modules match the interests within a topic field contained in the messages.

25. A method as claimed in claim 17, wherein the filtering/matching modules are located at the network interface of the local server hosts.

26. A method as claimed in claim 17, wherein the filtering/matching modules are located at the ingress/egress switches.

* * * * *